(12) United States Patent
Sattanathan et al.

(10) Patent No.: US 11,552,958 B2
(45) Date of Patent: Jan. 10, 2023

(54) GEO-AWARE CAPTURE WITH REDUCED PERSONAL INFORMATION DISCLOSURE

(71) Applicant: Bank of America Corporation, Charlotte, NC (US)

(72) Inventors: Radha Sattanathan, Frisco, TX (US); Helga Russman, Southlake, TX (US); Sonja M. Brown, Lewisville, TX (US); Henry Nichol, University Park, TX (US); Kevin Luong Tran, Frisco, TX (US); Prathyusha Paida, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 119 days.

(21) Appl. No.: 17/060,128

(22) Filed: Oct. 1, 2020

(65) Prior Publication Data
US 2022/0109678 A1 Apr. 7, 2022

(51) Int. Cl.
*H04L 29/06* (2006.01)
*H04L 9/40* (2022.01)

(52) U.S. Cl.
CPC ........ *H04L 63/107* (2013.01); *H04L 63/0838* (2013.01); *H04L 63/102* (2013.01); *H04L 2463/082* (2013.01)

(58) Field of Classification Search
CPC .. H04L 63/102; H04L 63/0838; H04L 63/107
See application file for complete search history.

(56) References Cited

U.S. PATENT DOCUMENTS

| | | | | |
|---|---|---|---|---|
| 8,676,593 | B2* | 3/2014 | Nagpal | G06Q 30/02 709/217 |
| 9,178,867 | B1* | 11/2015 | Letz | H04L 12/00 |
| 9,313,208 | B1* | 4/2016 | Letz | G06Q 10/0631 |
| 9,374,427 | B2* | 6/2016 | Shekher | H04L 67/1097 |
| 9,514,324 | B1* | 12/2016 | Potlapally | G06F 21/6218 |
| 10,785,227 | B2* | 9/2020 | Baldwin | H04L 63/1433 |
| 2017/0006126 | A1* | 1/2017 | Long, III | H04L 63/10 |
| 2017/0277906 | A1* | 9/2017 | Camenisch | G06F 21/6254 |
| 2018/0007546 | A1* | 1/2018 | Anderson | H04L 67/10 |
| 2021/0067589 | A1* | 3/2021 | Kreutzer | H04L 67/1097 |

* cited by examiner

*Primary Examiner* — Tongoc Tran
(74) *Attorney, Agent, or Firm* — Weiss & Arons LLP (57) ABSTRACT

Systems and methods for authenticating and executing a user request with increased security and efficiency are provided. A method may include receiving a selection from a user to restrict informational access of a selected administrator who is logged in to a system network, and locking access of the administrator to secure user information. The method may also include receiving, from the user, limited identifying information, and transmitting to the user, based on the limited identifying information, a uniform resource locator (URL) link and a one-time password (OTP). The method may also include achieving 2-factor authentication when the user accesses the URL link and submits the OTP, and receiving from the user the secure user information and a service request. In response to receiving the secure user information and the service request, the method may include executing a response to the service request via the system network.

20 Claims, 5 Drawing Sheets

GEO-AWARE CAPTURE WITH REDUCED PERSONAL INFORMATION DISCLOSURE

FIELD OF TECHNOLOGY

Aspects of the disclosure relate to computer systems. Specifically, aspects of the disclosure relate to computer systems for identity authentication.

BACKGROUND OF THE DISCLOSURE

Many networks offer services to network users. Some services utilize sensitive user data. Some services use sensitive user data to initiate the service. Difficulties may arise in obtaining the sensitive data when an unsecure or unrecognized channel is used to initiate or provide the service.

For example, a user may request the service via a telephonic system. The user may verbally request the service from a system administrator over the telephone. The user may not recognize the administrator. The user may be uncomfortable providing sensitive data over a telephonic system and/or to an unfamiliar administrator.

It would be desirable, therefore, to provide systems and methods for transmitting sensitive data with increased security. It would be further desirable for the systems and methods to provide location recognition for increased efficiency.

SUMMARY OF THE DISCLOSURE

Aspects of the disclosure relate to systems and methods for authenticating and executing a user request with increased security and efficiency. A system may include a network that provides network information access to an administrator who is logged in to the network. The system may include a processor, and a non-transitory memory storing the network information and computer executable instructions. The computer executable instructions, when run on the processor, may execute at least part of the system features.

The system may be configured to receive a selection from a user to restrict informational access of a selected administrator who is logged in to the network. The system may be configured to lock access of the administrator to secure user information. The secure user information may be otherwise accessible via the network.

The system may be configured to receive, from the user, limited identifying information, and transmit to the user, based on the limited identifying information, a uniform resource locator (URL) link and a one-time password (OTP). The system may be configured to achieve 2-factor authentication. 2-factor authentication may be achieved when the user accesses the URL link and submits the OTP. The system may be configured to receive from the user, at the network, the secure user information and a service request. In response to receiving the secure user information and the service request, the system may be configured to execute a response to the service request via the system network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to systems and methods for authenticating and executing a user request with increased security and efficiency. A system is provided which may include a network. The network may provide network information access to an administrator who is logged in to the network. The system may be otherwise referred to herein as a platform. The system may include a processor, and a non-transitory memory storing the network information and computer executable instructions. The computer executable instructions, when run on the processor, may execute at least some system features.

The system may be configured to receive a selection from a user to restrict informational access of a selected administrator who is logged in to the network. The administrator may, for example, be a network agent communicating with and/or assisting the user—e.g., via an internet messaging system, text, or telephone. The user may not recognize the administrator. The user may perceive the line of communication as insecure. The user may not want to convey sensitive information to the administrator over the line of communication.

The system may be configured to lock access of the administrator to secure user information. Although the secure information may typically be routed through the administrator, the system may bypass the administrator and provide an alternative mechanism for submission of the information. In some embodiments, the system may generate a flag that prevents the administrator from accessing the information.

The secure user information may be otherwise accessible via the network. Secure user information may, for example, include a social security number, an account number, and/or any other suitable sensitive data of the user that may be useful for initiating or providing a service.

The system may be configured to receive, from the user, limited identifying information. The user may convey the limited information via the phone or other suitable communication mechanism with which the user may communicate with the administrator. Limited identifying information may, for example, include a name, phone number, and/or email address of the user. The system may transmit to the user, based on the limited identifying information, a uniform resource locator (URL) link and/or a one-time password (OTP).

The URL link and the OTP may, in certain embodiments, be transmitted to the user via email and/or text message. For example, in one exemplary embodiment, the URL link may be transmitted via text message and the OTP may be transmitted via email.

The system may be configured to achieve 2-factor authentication. 2-factor authentication may be achieved when the user accesses the URL link and submits the OTP. The system may be configured to receive from the user, at the network, the secure user information and a service request. In response to receiving the secure user information and the service request, the system may be configured to execute a response to the service request via the system network.

In some embodiments, the URL link may include a geo-aware component. The geo-aware component may generate location data about the user when the user accesses the URL. The system may be further configured to update location information based on information generated by the geo-aware component when the user accesses the URL link. The system may also be configured to execute the response based at least in part on the updated location information.

In certain embodiments, as part of executing the response, the system may be further configured to determine, based on the updated location information, a physical service location that is closest to the user from among several service locations. The system may refer the user to that physical service location.

In some embodiments, as part of executing the response, the system may be further configured to offer the user a service or a promotion that is available in a location associated with the updated location information.

In certain embodiments, the user may submit the service request directly via a computing device. The computing device may be a device (e.g., a smart phone or personal computer) on which the user accesses the URL link and submits the OTP.

In some embodiments, the service request may be received via the administrator. For example, the administrator may receive the service request from the user and submit the service request via the system application.

A method for authenticating and executing a user request with increased security and efficiency is provided. The method may include receiving a selection from a user to restrict informational access of a selected administrator. The administrator may be logged in to a system network. The method may include locking access of the administrator to secure user information. The secure user information may be otherwise accessible via the system network.

The method may include receiving, from the user, limited identifying information, and transmitting to the user, based on the limited identifying information, a uniform resource locator (URL) link and a one-time password (OTP). The method may include achieving 2-factor authentication. 2-factor authentication may be achieved when the user accesses the URL link and submits the OTP. The method may include receiving from the user, at the system network, the secure user information and a service request. In response to receiving the secure user information and the service request, the method may include executing a response to the service request via the system network. Methods may also be used in conjunction with system features described elsewhere herein.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
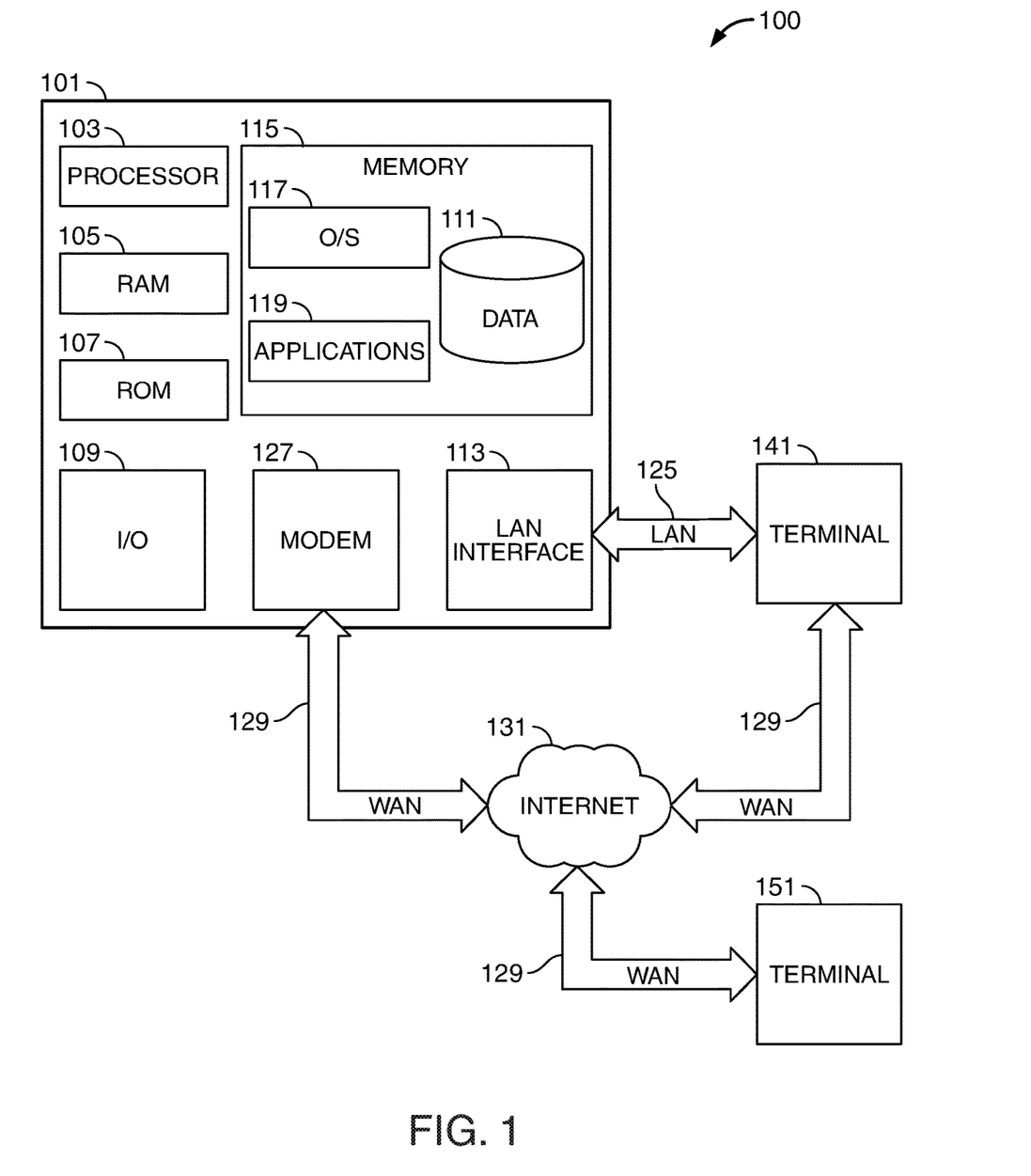
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to network service request initiation and/or execution. The input/output module may also include one or more speakers for providing audio output and a video display device for providing textual, audio, audiovisual, and/or graphical output. The input and output may be related to computer application functionality. The input and output may be related to network service request initiation and/or execution.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to network service request initiation and/or execution.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
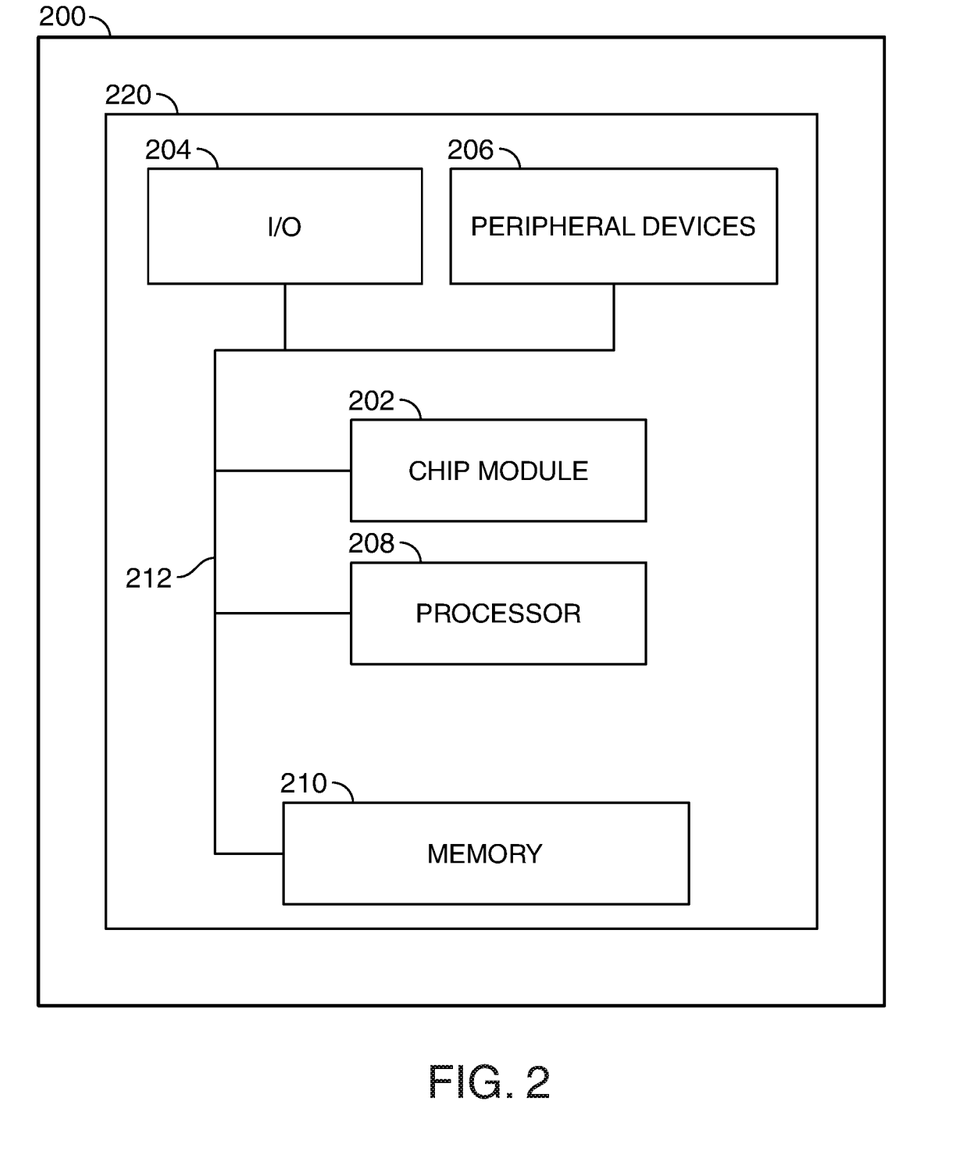
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
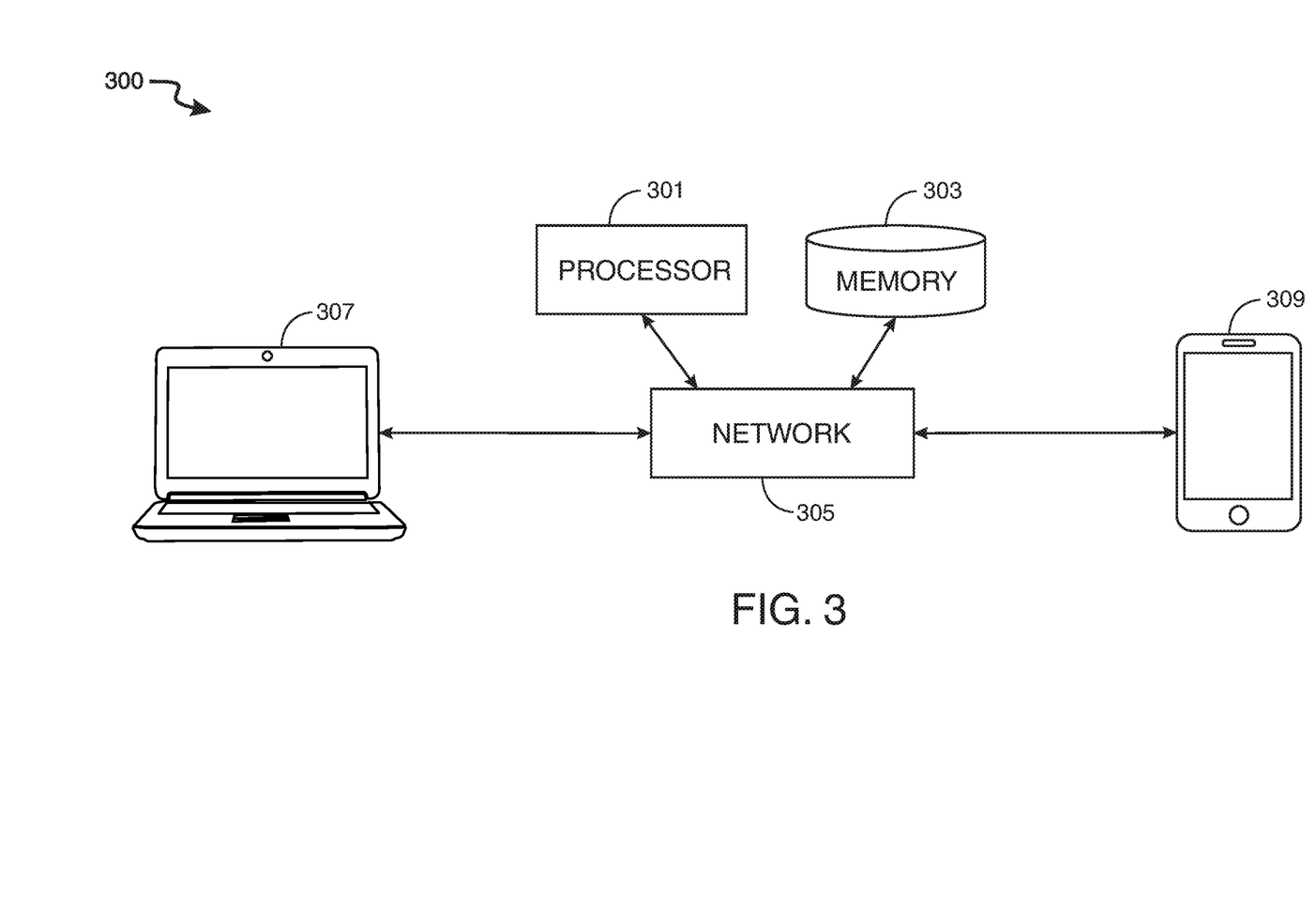
FIG. 3 shows an illustrative system architecture in accordance with principles of the disclosure.

FIG. 3 shows illustrative architecture of system 300 according to aspects of the disclosure. System 300 includes processor 301, memory 303, and network 305. Processor 301, memory 303, and network 305 may be interconnected. Administrator device 307 and/or user device 309 may be connected to the system via network 305. The connection may be achieved via a secure login to an application. The login may be achieved via a portal. Administrator device 307 and/or user device 309 may be any suitable computing and/or communication devices. For example, one or both devices may be telephones, smart phones, laptops, desktops, etc.

Figure 4:
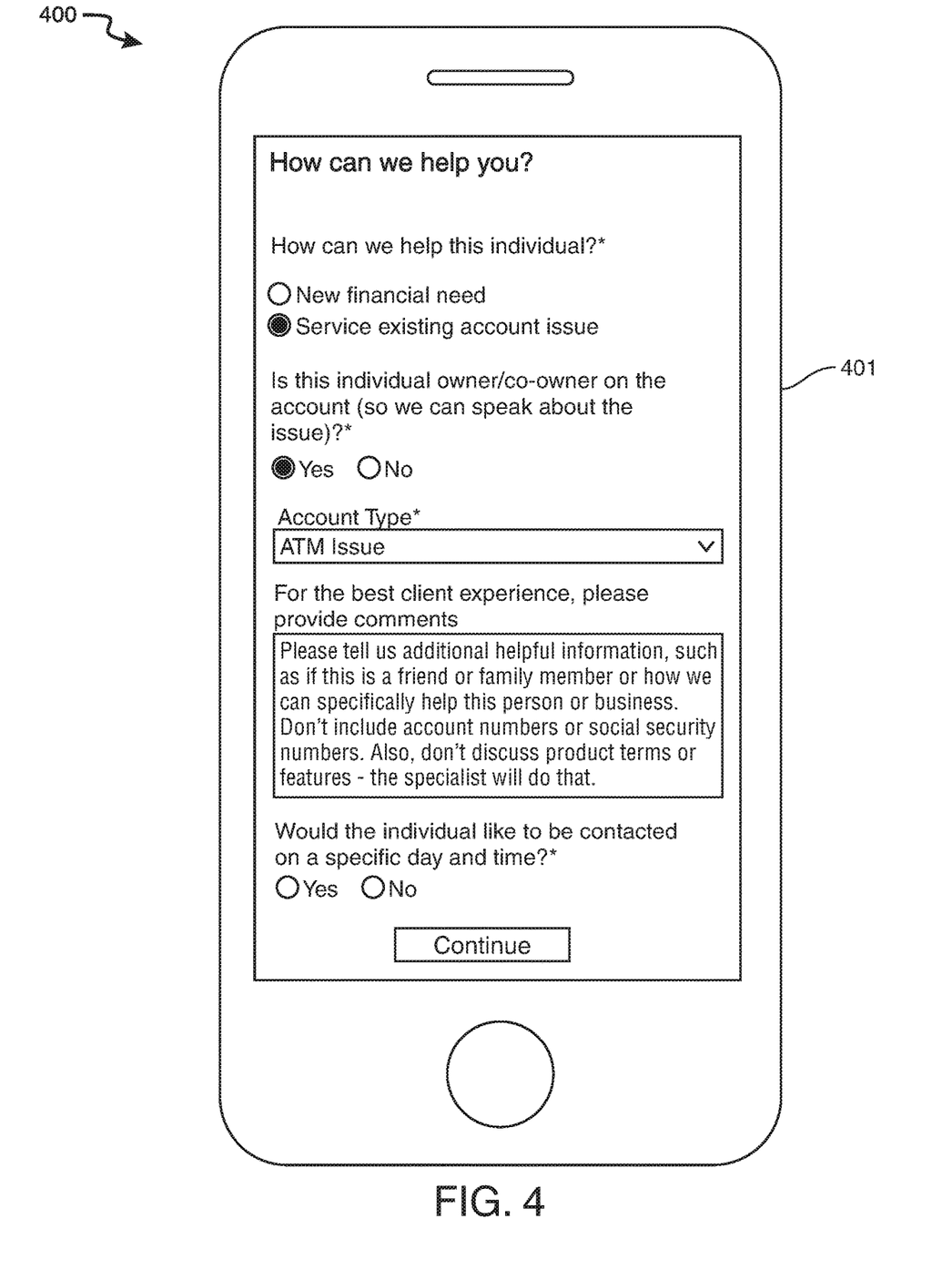
FIG. 4 shows an illustrative system screenshot in accordance with principles of the disclosure.

FIG. 4 shows illustrative system screenshot 400 in accordance with principles of the disclosure. Screenshot 400 shows one illustrative implementation of a screen that may be displayed on computing device 401 of a system administrator. Screenshot 400 includes various questions that may be useful in routing the service request to the proper subsystem. For example, in the context of a financial service request from a financial network, a request relating to a new financial need may be routed to a different subsystem from a request relating to an existing account. Similarly, a request may be routed differently depending on an account type to which the request relates.

Figure 5:
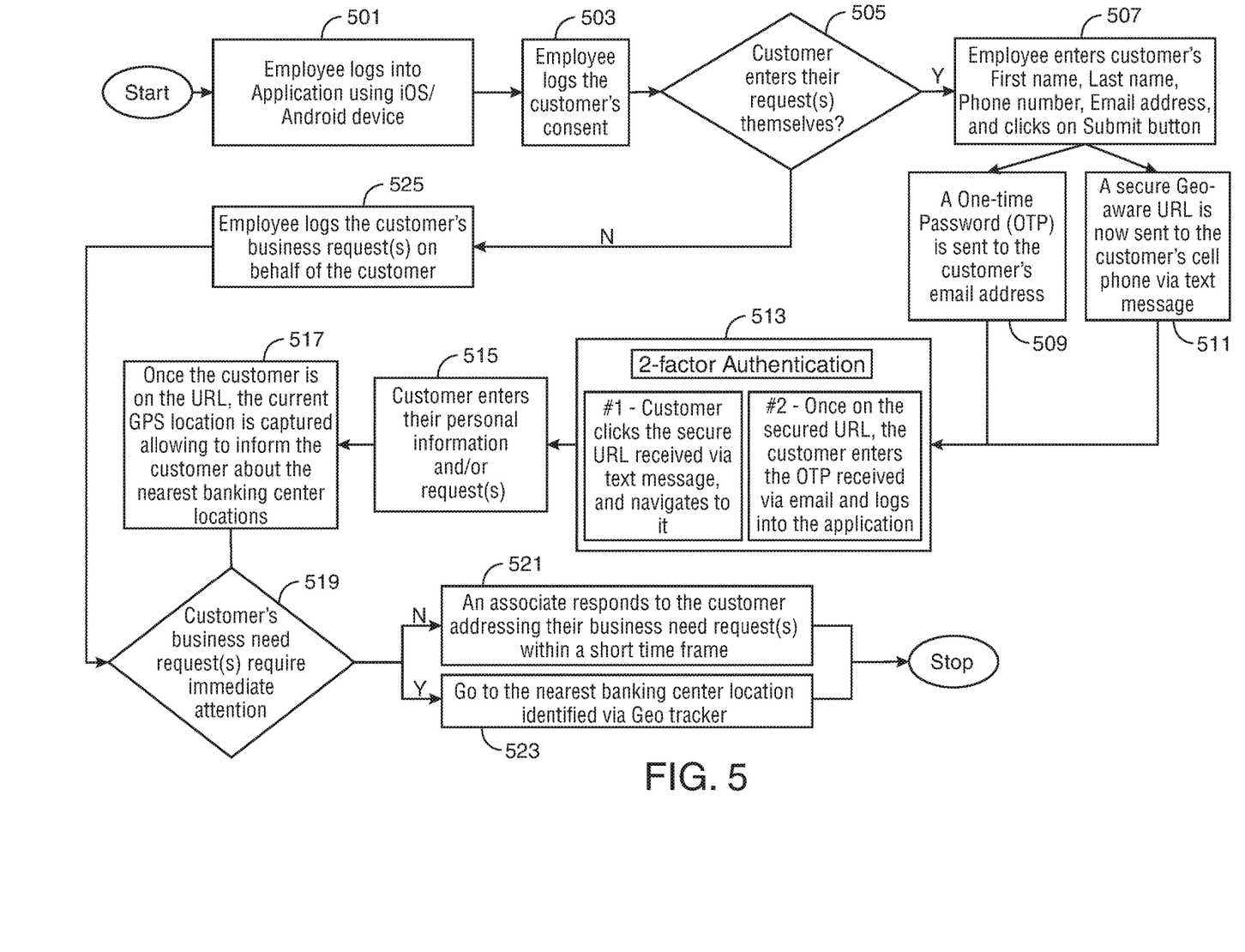
FIG. 5 shows an illustrative system flowchart in accordance with principles of the disclosure.

FIG. 5 shows illustrative system flowchart 500 in accordance with principles of the disclosure. Flowchart 500 begins at step 501, employee (otherwise referred to herein an administrator) logs into the network. The login may, in certain embodiments, be achieved via an application running on a computing device, such as a mobile device, laptop, desktop, or any other suitable device.

The employee may receive consent from a customer (alternatively referred to herein as a user) to restrict access to sensitive information and to provide access to limited personal information and/or location information. The employee may log the consent system to the system network at 503.

The customer may have the option at step 505 to enter a request by themselves. Entering the request themselves may be consistent with a selection to restrict access of the employee to sensitive information. If the customer selects this option, the customer may convey limited information, such as name, phone number, and email address, to the employee.

The employee may enter the limited information at step 507. Based on the consent and the limited information, the system may transmit a one-time password (OTP) at 509 and a URL at 511 to the customer. 2-factor authentication may be achieved at 513. Once authenticated, at step 515 the customer may enter, via a device of the customer, sensitive personal information and/or the request. At step 517 the system may update location information about the customer based on a geo-aware component of the URL. The updated location information may be useful in referring the customer to a physical service location (e.g., a bank branch) that is closest to the customer's location.

At step 519 the system may determine if the request requires an urgent response that cannot be achieved remotely via the network. If it does, the system may refer the customer to the nearest physical location at step 523. If it does not, the request may be addressed remotely via the network at 521. For example, in a scenario where the request includes an account balance inquiry, the response may include transmitting the account balance information directly to the device of the customer without providing the employee access to the information.

If at step 505 the customer opted for the employee to enter the request, the employee may enter the request and/or the sensitive information at step 525. The process may proceed to the inquiry at step 519, as described above.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for geo-aware identity capture with reduced personal information disclosure are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for authenticating and executing a user request with increased security and efficiency, the method comprising:
   receiving a selection from a user to restrict informational access of a selected administrator to secure user information, said administrator being logged in to a system network;
   in response to the selection, locking access of the administrator to the secure user information, said secure user information that is otherwise accessible via the system network;
   receiving at the administrator, from the user, limited identifying information;
   transmitting to the user, based on the limited identifying information, a uniform resource locator (URL) link and a one-time password (OTP);
   achieving 2-factor authentication, said 2-factor authentication being achieved when the user accesses the URL link and submits the OTP;
   receiving from the user, at the system network and bypassing the administrator, the secure user information and a service request; and
   in response to receiving the secure user information and the service request, executing a response to the service request via the system network.

2. The method of claim 1, wherein the URL link comprises a geo-aware component, and the method further comprises:
   updating location information based on information generated by the geo-aware component when the user accesses the URL link; and
   executing the response based at least in part on the updated location information.

3. The method of claim 2, wherein the executing the response comprises:
   determining, based on the updated location information, a physical service location that is closest to the user from a plurality of service locations; and
   referring the user to said physical service location.

4. The method of claim 2, wherein the executing the response comprises offering the user a service or a promotion that is available in a location associated with the updated location information.

5. The method of claim 1, wherein the URL link and the OTP are transmitted to the user via email and/or text message.

6. The method of claim 5, wherein the URL link is transmitted via text message and the OTP is transmitted via email.

7. The method of claim 1, wherein the limited identifying information comprises a name, phone number, and email address of the user.

8. The method of claim 1, wherein the secure user information comprises a social security number and an account number of the user.

9. The method of claim 1, wherein the user submits the service request directly via a computing device, said computing device being a device on which the user accesses the URL link and submits the OTP.

10. The method of claim 1, wherein the service request is received via the administrator receiving the service request from the user and submitting the service request via the system application.

11. A system for authenticating and executing a user request with increased security and efficiency, the system comprising:
    a network that provides network information access to an administrator who is logged in to the network;
    a processor; and
    a non-transitory memory storing the network information and computer executable instructions, said instructions that, when run on the processor, are configured to:

receive a selection from a user to restrict informational access, to secure user information, of a selected administrator who is logged in to the network;

in response to the selection, lock access of the administrator to the secure user information, said secure user information that is otherwise accessible via the network;

receive at the administrator, from the user, limited identifying information;

transmit to the user, based on the limited identifying information, a uniform resource locator (URL) link and a one-time password (OTP);

achieve 2-factor authentication, said 2-factor authentication being achieved when the user accesses the URL link and submits the OTP;

receive from the user, at the network while bypassing the administrator, the secure user information and a service request; and in response to receiving the secure user information and the service request, execute a response to the service request via the system network.

12. The system of claim 11, wherein the URL link comprises a geo-aware component, and the system is further configured to:

update location information based on information generated by the geo-aware component when the user accesses the URL link; and execute the response based at least in part on the updated location information.

13. The system of claim 12, wherein, as part of executing the response, the system is further configured to:

determine, based on the updated location information, a physical service location that is closest to the user from a plurality of service locations; and refer the user to said physical service location.

14. The system of claim 12, wherein, as part of executing the response, the system is further configured to offer the user a service or a promotion that is available in a location associated with the updated location information.

15. The system of claim 11, wherein the URL link and the OTP are transmitted to the user via email and/or text message.

16. The system of claim 15, wherein the URL link is transmitted via text message and the OTP is transmitted via email.

17. The system of claim 11, wherein:

the limited identifying information comprises a name, phone number, and email address of the user; and the secure user information comprises a social security number and an account number of the user.

18. The system of claim 11, wherein the user submits the service request directly via a computing device, said computing device being a device on which the user accesses the URL link and submits the OTP.

19. The system of claim 11, wherein the service request is received via the administrator receiving the service request from the user and submitting the service request via the system application.

20. A platform for authenticating and executing a user request with increased security and efficiency, the platform comprising:

a network that provides network information access to an administrator who is logged in to the network;

a processor; and a non-transitory memory storing the network information and computer executable instructions, said instructions that, when run on the processor, are configured to:

receive a selection from a user to restrict informational access, to secure user information, of a selected administrator who is logged in to the network;

in response to the selection, lock access of the administrator to the secure user information, said secure user information that is otherwise accessible via the network;

receive at the administrator, from the user, limited identifying information, said limited identifying information comprising a phone number and an email address;

transmit to the user, based on the limited identifying information, a uniform resource locator (URL) link and a one-time password (OTP), said URL comprising a geo-aware component, wherein the URL link is transmitted via a text message to the phone number and the OTP is transmitted via email to the email address;

achieve 2-factor authentication, said 2-factor authentication being achieved when the user accesses the URL link and submits the OTP;

update location information based on information generated by the geo-aware component when the user accesses the URL link;

receive from the user, at the network while bypassing the administrator, the secure user information and a service request; and in response to receiving the secure user information and the service request, execute a response to the service request via the system network;

wherein, when the response includes a referral to a physical service location, the platform is further configured to:

determine, based on the updated location information, the physical service location that is closest to the user from a plurality of service locations; and refer the user to said physical service location.

* * * * *

UNITED STATES PATENT AND TRADEMARK OFFICE
CERTIFICATE OF CORRECTION

| | |
|---|---|
| PATENT NO. | : 11,552,958 B2 |
| APPLICATION NO. | : 17/060128 |
| DATED | : January 10, 2023 |
| INVENTOR(S) | : Radha Sattanathan et al. |

It is certified that error appears in the above-identified patent and that said Letters Patent is hereby corrected as shown below:

On the Title Page

In item (72), please replace inventor "Helga Russman" with --Helga Russmann--.

Signed and Sealed this
Fourteenth Day of November, 2023

Katherine Kelly Vidal
*Director of the United States Patent and Trademark Office*